May 17, 1927.

P. P. KOSTOCK

AUTOMOBILE TIRE

Filed Oct. 19, 1925

Witnesses:

Inventor:
Paul P. Kostock,
By Joshua R. H. Potts
His Attorney

May 17, 1927.

P. P. KOSTOCK 1,628,790

AUTOMOBILE TIRE

Filed Oct. 19, 1925

Witnesses

Inventor:
Paul P. Kostock,
By Joshua R H Potts
His Attorney

Patented May 17, 1927.

1,628,790

UNITED STATES PATENT OFFICE.

PAUL P. KOSTOCK, OF CHICAGO, ILLINOIS.

AUTOMOBILE TIRE.

Application filed October 19, 1925. Serial No. 63,215.

My invention relates to automobile tires, the invention being more particularly related to an automobile tire involving a demountable tread; and the main object of my invention is the provision of an improved tire of this kind which will embody certain desired features of simplicity, efficiency and convenience and which will be economical in manufacture.

Other objects will appear hereinafter.

The invention consists in the combinations and arrangements hereinafter described and claimed.

The invention will be best understood by reference to the accompanying drawings, forming a part of this specification, and in which Fig. 1 represents a side elevational view of an automobile tire embodying my invention, parts being broken away and parts being shown in section;

Figure 1:
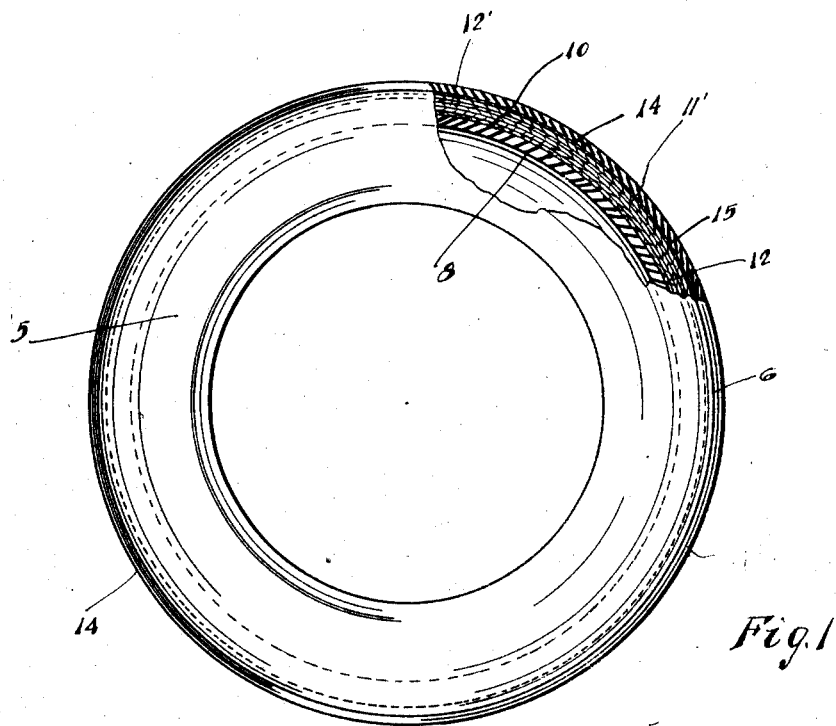
Figure 2:
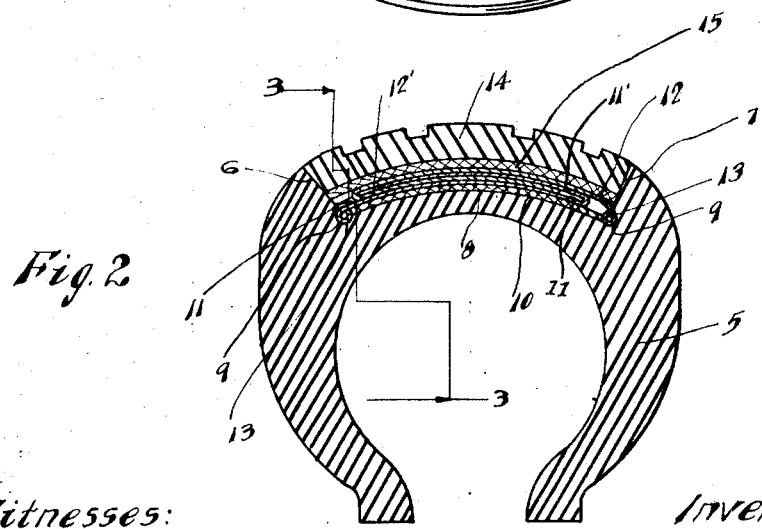
Fig. 2 represents a cross section through a tire embodying my invention.
Figure 3:
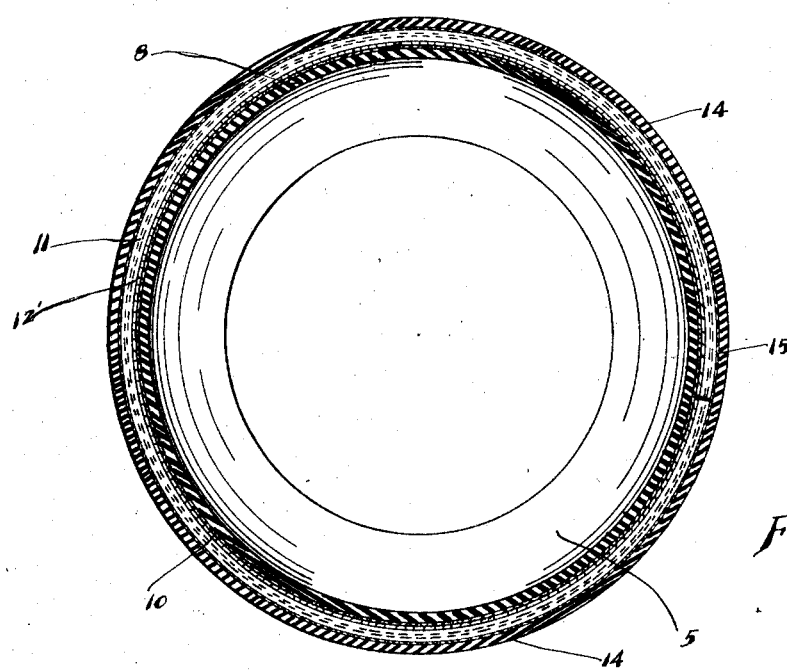
Fig. 3 is a sectional view taken on the line 3—3 of Fig. 2.
Figure 4:
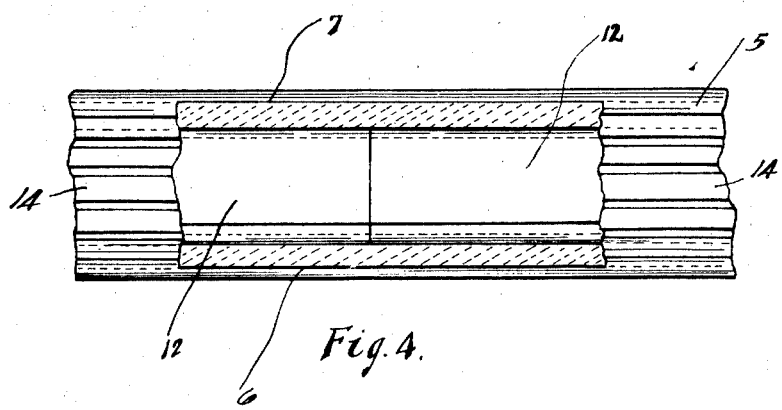
Fig. 4 is a fragmentary view showing the face of a tire with a portion of the tread body broken away.

The preferred embodiment of my invention, as illustrated in the accompanying drawings, comprises an automobile tire 5 of conventional type but provided with a circumferential recess where the tire bears on the roadway, such recess being defined by the side abutment walls 6 and 7 and a bottom wall 8. The side abutment walls 6 and 7 incline inwardly of the tire and toward each other, so that the circumferential recess narrows inwardly of the tire. The bottom wall 8 is preferably transversely convex, as shown in Fig. 2. At the junctions of the abutment walls 6 and 7 with the bottom wall 8, I preferably provide annular recesses 9 of circular form in cross section, the said recesses comprising a continuation of the circumferential recess between the abutment walls 6 and 7.

Preferably and as shown, a lining 10, made of any suitable protective material, intimately surrounds the bottom wall 8. Arranged within the circumferential recess and surrounding the lining 10, are two metallic ring members 11 and 12 which are yieldably interengaged. These interengaged ring members are transversely convex in form in agreement with the bottom wall 8. In the present form of construction, the ring members 11 and 12 are slidably interengaged by providing the ring member 11 with a conformingly overbent portion 11' and the ring member 12 with a conformingly underbent portion 12', the said portions 11' and 12' being slidably interengaged as clearly depicted in Fig. 2. The outer or free annular edges of the ring members 11 and 12 are rolled upon themselves to produce annular beads 13 of a dimension suitable for snug seating in the annular recesses 9. The ring members 11 and 12, thus interengaged within the circumferential recess and surrounding the bottom wall 10, are adapted to have limited relative movement in response to the yielding or flexing movements of the tire body during travel.

14 denotes a ring-shaped tread body of transverse convexity in form and of a dimension to fit tightly between the abutment walls 6 and 7 and around the outer ring member 12 the annular edges of this tread body being inclined or beveled in agreement with the inclination of the abutment walls 6 and 7. The inner face of the tread body 14 is furnished with a protective lining 15 which bears firmly upon the outer ring member 12. By this arrangement, the ring members serve as shields to prevent the puncture of the inner tube, (not shown) which is enclosed by the tire body 5. In this connection, it is to be noted that the overall width of the ring members is sufficient to protect the inner tube from any article piercing the tread body; and further that the convex formation of these ring members will tend to divert any piercing article to the outer sides of the tire body and away from the tube therein contained. Obviously, the tread body 14 is detachable and may be removed for replacement by a fresh tread body.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. An automobile tire characterized by having a circumferential recess extending inwardly into the body of the tire about the tread region thereof; a pair of interfitting rings arranged in said recess and having rolled edges contacting the walls of said recess; and a tread body removably seated in said recess, substantially as described.

2. An automobile tire characterized by having a circumferential recess extending inwardly into the body of the tire about the tread region thereof and defined by opposed side walls and a bottom wall; a pair of rings surrounding the bottom wall, one of said rings provided with a conformingly overbent portion, and the other of the rings provided with a conformingly underbent portion, the said overbent and underbent portions being interengaged; and a tread body removably seated in said recess and surrounding said rings, substantially as described.

In testimony whereof I have signed my name to this specification.

PAUL P. KOSTOCK.